United States Patent
Kray et al.

(10) Patent No.: US 9,682,756 B1
(45) Date of Patent: Jun. 20, 2017

(54) SYSTEM FOR COMPOSITE MARINE PROPELLERS

(71) Applicant: General Electric Company, Schenectady, NY (US)

(72) Inventors: Nicholas Joseph Kray, Mason, OH (US); Stefaan Guido Van Nieuwenhove, Bavaria (DE); Peggy Lynn Baehmann, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/295,259

(22) Filed: Oct. 17, 2016

(51) Int. Cl.
*F01D 5/30* (2006.01)
*B63H 1/20* (2006.01)

(52) U.S. Cl.
CPC ............ *B63H 1/20* (2013.01); *B63B 2748/00* (2013.01)

(58) Field of Classification Search
CPC ................................ B63H 1/20; B64C 11/005
See application file for complete search history.

(56) References Cited

U.S. PATENT DOCUMENTS

| | | | |
|---|---|---|---|
| 390,615 A * | 10/1888 | Nye | B63H 1/20 403/359.6 |
| 1,050,119 A | 1/1913 | Flanders | |
| 2,474,562 A * | 6/1949 | Waterval | B64C 11/16 416/213 A |
| 2,942,842 A * | 6/1960 | Hayes | F01D 5/30 416/220 R |
| 4,466,776 A | 8/1984 | Camboulives | |
| 4,930,987 A | 6/1990 | Stahl | |
| 5,018,941 A | 5/1991 | Heurtel et al. | |
| 5,256,035 A | 10/1993 | Norris et al. | |
| 5,478,207 A * | 12/1995 | Stec | F01D 5/22 416/219 R |
| 5,611,665 A | 3/1997 | Angel | |
| 6,004,101 A * | 12/1999 | Schilling | F01D 5/28 416/219 R |
| 6,033,185 A * | 3/2000 | Lammas | F01D 5/3038 416/193 A |
| 6,183,202 B1 * | 2/2001 | Ganshaw | F01D 5/3007 416/219 R |
| 6,312,223 B1 | 11/2001 | Samuelsson | |

(Continued)

*Primary Examiner* — Gregory Anderson
*Assistant Examiner* — Jason Fountain
(74) *Attorney, Agent, or Firm* — General Electric Company; William Scott Andes

(57) ABSTRACT

A propeller assembly includes a central hub including a first forward-facing end, a second aft-facing end, a hub body extending therebetween, and a plurality of channels spaced circumferentially around the central hub. The propeller assembly further includes blade wedges configured to be inserted into and to retain blades within the channels of the central hub. Each blade includes a blade dovetail including a dovetail face configured to engage a respective channel sidewall and/or a respective wedge sidewall. The dovetail face includes a bearing portion that engages the respective channel sidewall and/or the respective wedge sidewall and a clearance portion that is spaced from the respective channel sidewall and/or the respective wedge sidewall by a clearance gap during a first loading of the propeller assembly and that engages the respective channel sidewall or wedge sidewall during a second loading, the second loading greater than the first loading.

20 Claims, 8 Drawing Sheets

(56) References Cited

U.S. PATENT DOCUMENTS

| | | |
|---|---|---|
| 6,537,031 B1 | 3/2003 | Bacskay |
| 8,235,666 B2 | 8/2012 | Rosenkranz et al. |
| 8,608,446 B2 | 12/2013 | Pickens et al. |
| 8,770,938 B2 * | 7/2014 | Kreiselmaier ........ F01D 5/3038 |
| | | 416/216 |
| 8,851,852 B2 | 10/2014 | Blatchford |
| 9,039,378 B2 | 5/2015 | Ulgen |
| 9,051,845 B2 | 6/2015 | Bommanakatte et al. |
| 9,068,465 B2 * | 6/2015 | Keny .................... F01D 5/3038 |
| 9,341,068 B2 * | 5/2016 | Nagano .................... F01D 5/30 |
| 2014/0079553 A1 | 3/2014 | Ulgen |

* cited by examiner

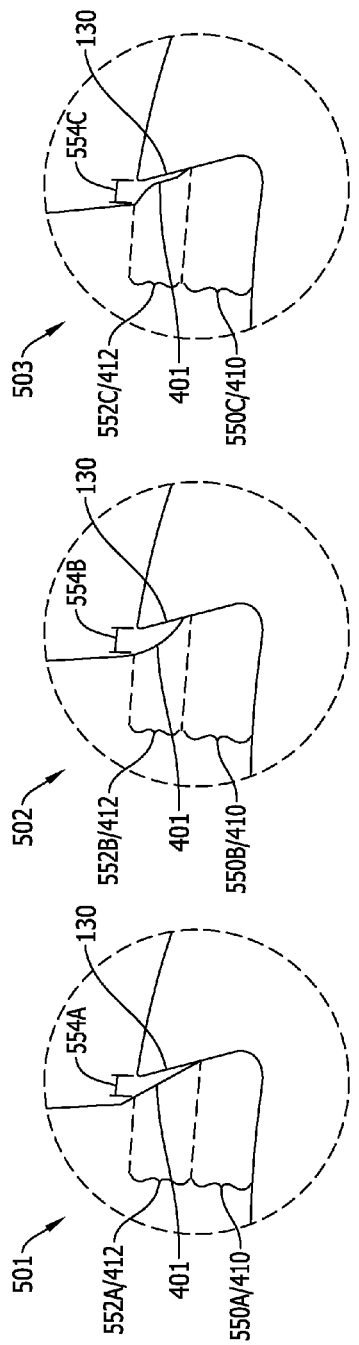

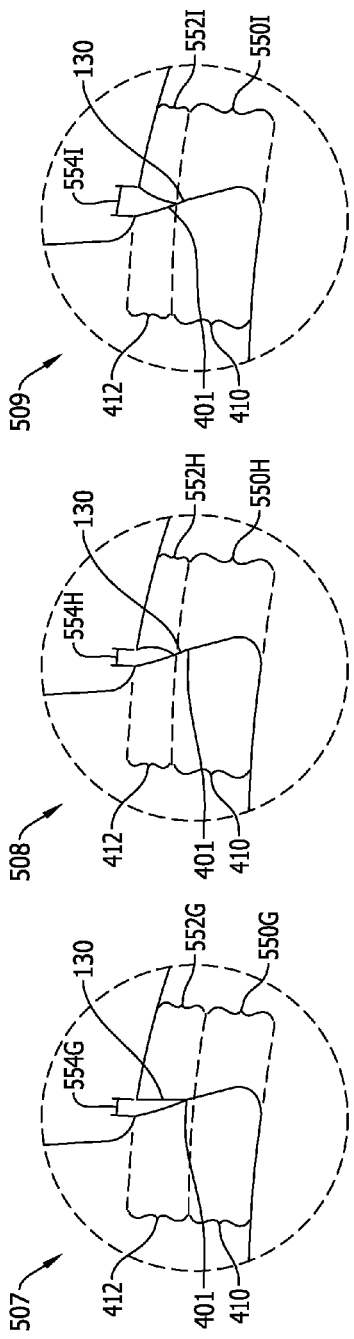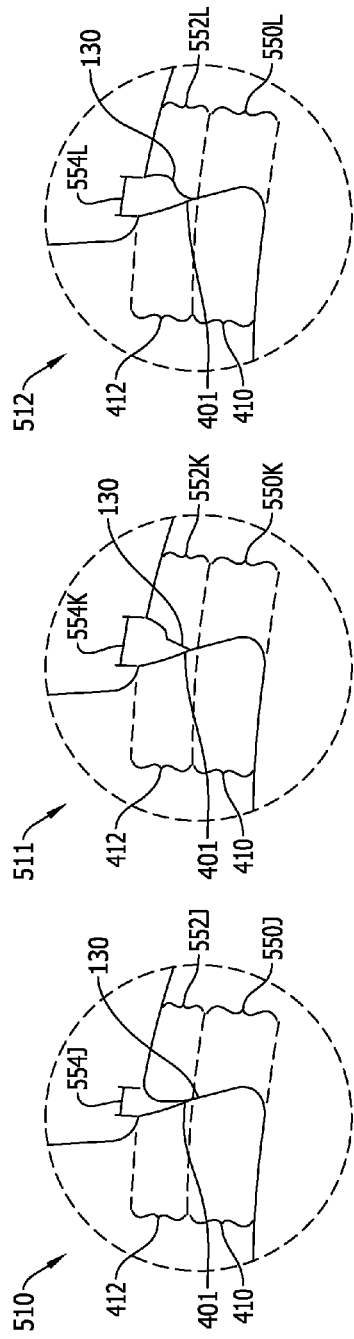

SYSTEM FOR COMPOSITE MARINE PROPELLERS

BACKGROUND

The field of the disclosure relates generally to propulsion systems and, more particularly, to a composite marine propeller and propeller assembly.

At least some known marine propulsion systems rely on a rotating propeller assembly including a central hub and propeller blades extending from the central hub to generate a propulsive force. During operation, the propeller blades become loaded due to the force of fluid flow over the propeller blades. Under certain conditions, such loading may be sufficient to cause bending or other deformation of the propeller blade. Bending may induce localized stress within the propeller blades. For example, stress may be induced due to areas of the propeller blade impinging upon other structures, such as the central hub. Such stress can result in premature failure of the propeller blades or may require the propeller blades to be heavier and more robust, thereby requiring a more powerful drive and decreasing the efficiency of the propeller assembly.

BRIEF DESCRIPTION

In one aspect, a propeller assembly is provided. The propeller assembly includes a central hub further including a first forward-facing end, a second aft-facing end, and a hub body extending therebetween and a plurality of channels spaced circumferentially around the central hub and extending between the first forward-facing end and the second aft-facing end, each channel of the plurality of channels comprising a channel sidewall. The propeller assembly further includes a plurality of blade wedges configured to be inserted into the plurality of channels, each blade wedge of the plurality of blade wedges including a wedge sidewall. The propeller assembly also includes a plurality of blades, each blade of the plurality of blades including a blade dovetail retained within a respective channel of the plurality of channels by a respective blade wedge of the plurality of blade wedges. Each blade dovetail further includes a dovetail face configured to engage the one of a respective channel sidewall of the respective channel and a respective wedge sidewall of the respective blade wedge. The dovetail face includes a bearing portion configured to engage one of the respective channel sidewall and the respective wedge sidewall and a clearance portion configured to be spaced from the one of the respective channel sidewall and the respective wedge sidewall by a clearance gap during a first loading of the propeller assembly and to be engaged with the one of the respective channel sidewall and the respective wedge sidewall during a second loading of the propeller assembly, the second loading greater than the first loading.

In another aspect, a separable blade assembly for use in a rotating bladed assembly is provided, the rotating bladed assembly including a central hub including a first forward-facing end, a second aft-facing end, and a hub body extending therebetween and a plurality of channels spaced circumferentially around the central hub and extending between the first forward-facing end and the second aft-facing end. The separable blade assembly includes a blade wedge configured to be inserted into a respective channel of the plurality of channels and further including a wedge sidewall. The separable blade assembly further includes a blade including a blade dovetail configured to be retained within the respective channel of the plurality of channels by the blade wedge. The blade dovetail includes a dovetail face configured to engage one of a respective channel sidewall of the respective channel and the wedge sidewall. The dovetail face includes a bearing portion configured to engage the one of the respective channel sidewall and the wedge sidewall and a clearance portion configured to be spaced from the one of the respective channel sidewall and the wedge sidewall by a clearance gap during a first loading of the rotating bladed assembly and to be engaged with the one of the respective channel sidewall and the respective wedge sidewall during a second loading of the propeller assembly, the second loading greater than the first loading.

In yet another aspect, a propeller assembly is provided. The propeller assembly includes a central hub including a first forward-facing end, a second aft-facing end, and a hub body extending therebetween, and an outer radial surface, the outer radial surface further including a plurality of circumferentially spaced flats. The propeller assembly further includes a plurality of blade wedges coupled to at least a portion of the plurality of circumferentially spaced flats, each blade wedge of the plurality of blade wedges including a wedge sidewall. The plurality of blade wedges define a plurality of channels spaced circumferentially around the central hub, extending between said forward end and said aft end. The propeller assembly further includes a plurality of blades, each blade of the plurality of blades including a blade dovetail retained within a respective channel of the plurality of channels by a respective blade wedge of the plurality of blade wedges. The blade dovetail includes a dovetail face configured to engage a respective wedge sidewall of the respective blade wedge. The dovetail face includes a bearing portion configured to engage the respective wedge sidewall of the respective blade wedge and a clearance portion configured to be spaced from the respective wedge sidewall by a clearance gap during a first loading of the propeller assembly and to be engaged with the respective wedge sidewall during a second loading of the propeller assembly, the second loading greater than the first loading.

DRAWINGS

These and other features, aspects, and advantages of the present disclosure will become better understood when the following detailed description is read with reference to the accompanying drawings in which like characters represent like parts throughout the drawings, wherein:

FIGS. 5-16 are detail views of the circumferential segment of FIG. 4;

Figure 1:
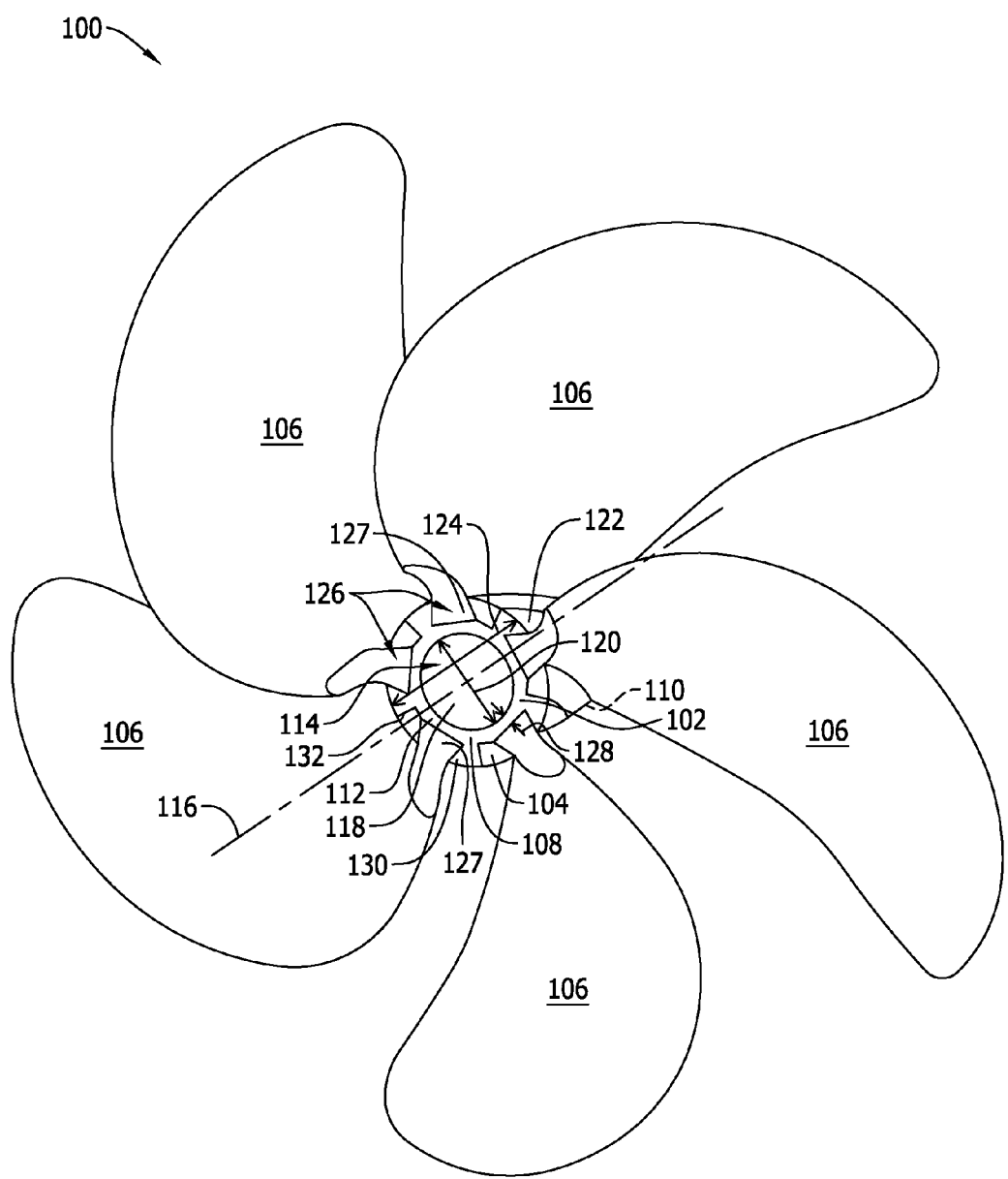
FIG. 1 is a perspective view of a marine propeller assembly in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of the propeller assembly. Moreover, the terms "radial" and "radially" refer to directions and orientations that extend substantially perpendicular to the centerline of the propeller assembly. In addition, as used herein, the terms "circumferential" and "circumferentially" refer to directions and orientations that extend arcuately about the centerline of the propeller assembly.

Embodiments of the propeller assembly described herein facilitate reducing stresses induced in propeller blades of propeller assemblies and, in particular, propeller blades of propeller assemblies including separable propeller blades. The propeller assembly includes a central hub and a plurality of separable propeller blades configured to be coupled to the central hub. In one embodiment, each of the propeller blades generally includes a blade dovetail configured to be retained within a channel defined by the central hub and a blade wedge. In another embodiment, each of the propeller blades is retained by pairs of wedges coupled to the central hub. At least one face of the blade dovetail includes a bearing portion configured to be engaged with at least a portion of a sidewall of the channel sidewall (e.g., a sidewall of the central hub or a sidewall of the blade wedge) and a clearance portion configured to be spaced from the channel sidewall during a first loading of the propeller assembly and to be engaged with the sidewall of the channel during a second loading of the propeller assembly, the second loading greater than the first loading. The clearance portion generally accommodates at least some bending of the propeller blade during operation, thereby reducing stresses induced in the propeller blade.

While described in the context of a marine propeller, it should be understood that the systems and methods described herein are also applicable to other propulsion and turbomachine systems including, without limitation, turboprop engines, turboshaft engines, turbojet engines, open rotor engines, and any other turbine engine where reduced blade stresses are desirable.

FIG. 1 is a perspective view of a marine propeller assembly 100 in accordance with an example embodiment of the present disclosure. In the example embodiment, marine propeller assembly 100 includes a hub 102, a plurality of wedges 104, and a plurality of separable blades 106.

Hub 102 includes a first face 108, a second face 110 (not shown in FIG. 1, facing away from the view in FIG. 1), and a hub body 112 extending between first face 108 and second face 110. In the example embodiment, first face 108 is spaced axially forward of second face 110. Hub body 112 includes a central bore 114 that is axisymmetric with an axis of rotation 116 of marine propeller assembly 100. Bore 114 includes a radially inner bore surface 118 having an internal diameter (ID) 120. Hub 102 includes a radially outer hub surface 122 having an outer diameter (OD) 124. In one embodiment, outer hub surface 122 includes a plurality of dovetail grooves 126, also referred to herein as "dovetail channels" or "channels," that extend radially inwardly from outer hub surface 122 a predetermined depth 128. Each of the plurality of dovetail grooves 126 extend generally axially along hub body 112 from first face 108 to second face 110. Each of the plurality of dovetail grooves 126 includes a first undercut sidewall 130, also referred to herein as a "channel sidewall," and a second sidewall 132 spaced apart circumferentially. Each of the plurality of dovetail grooves 126 is configured to receive a respective wedge 104 of the plurality of wedges 104 and a dovetail 127 of respective blade 106 of the plurality of separable blades 106.

Figure 2:
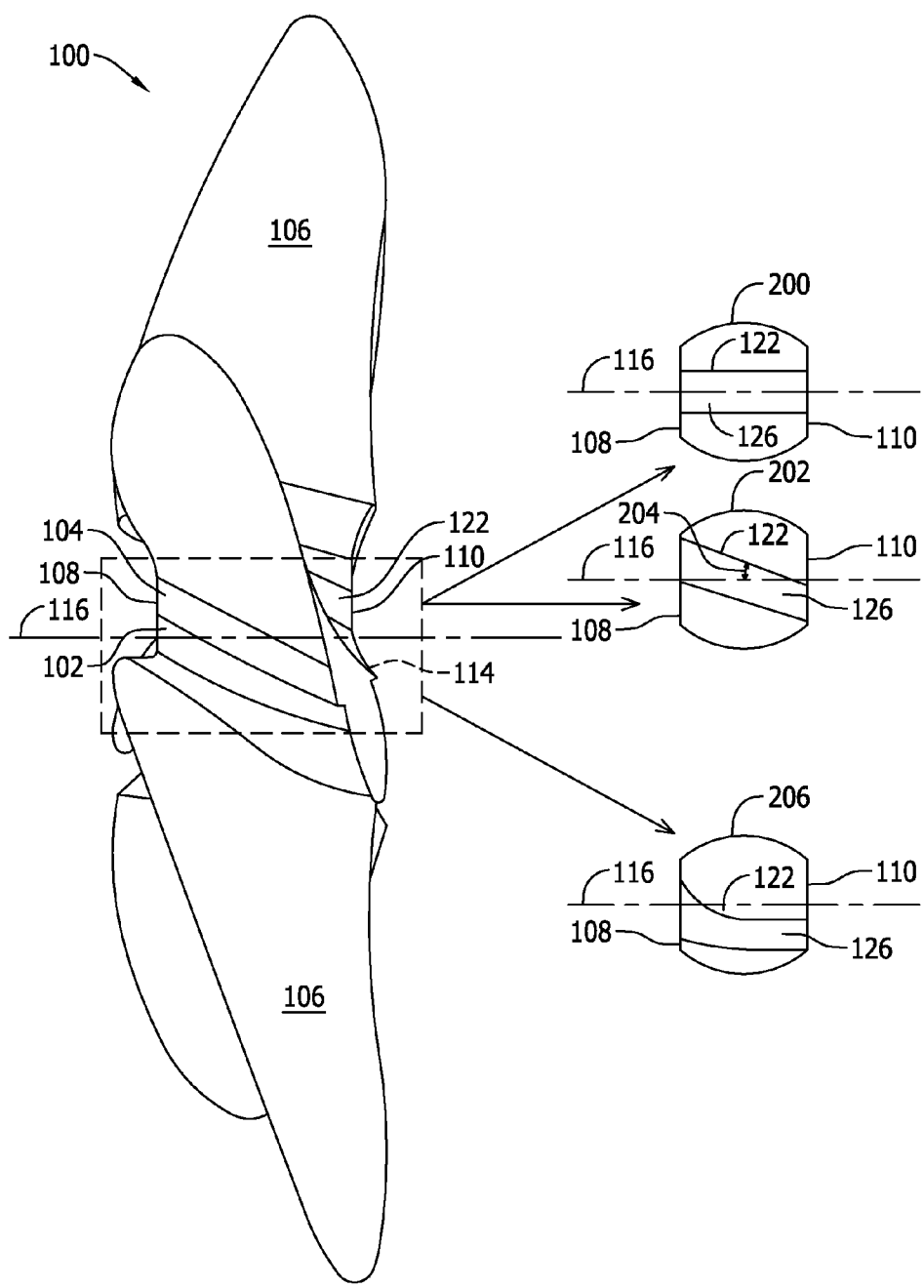
FIG. 2 is a side view of the marine propeller assembly of FIG. 1.

FIG. 2 is a side view of marine propeller assembly 100. In the example embodiment, a detail 200 of hub 102 illustrates dovetail groove 126 that extends straight axially between first face 108 and second face 110 parallel to axis of rotation 116. A detail 202 illustrates dovetail groove 126 that extends linearly at a skew angle 204 between first face 108 and second face 110. A detail 206 illustrates dovetail groove 126 that extends arcuately between first face 108 and second face 110.

Figure 3:
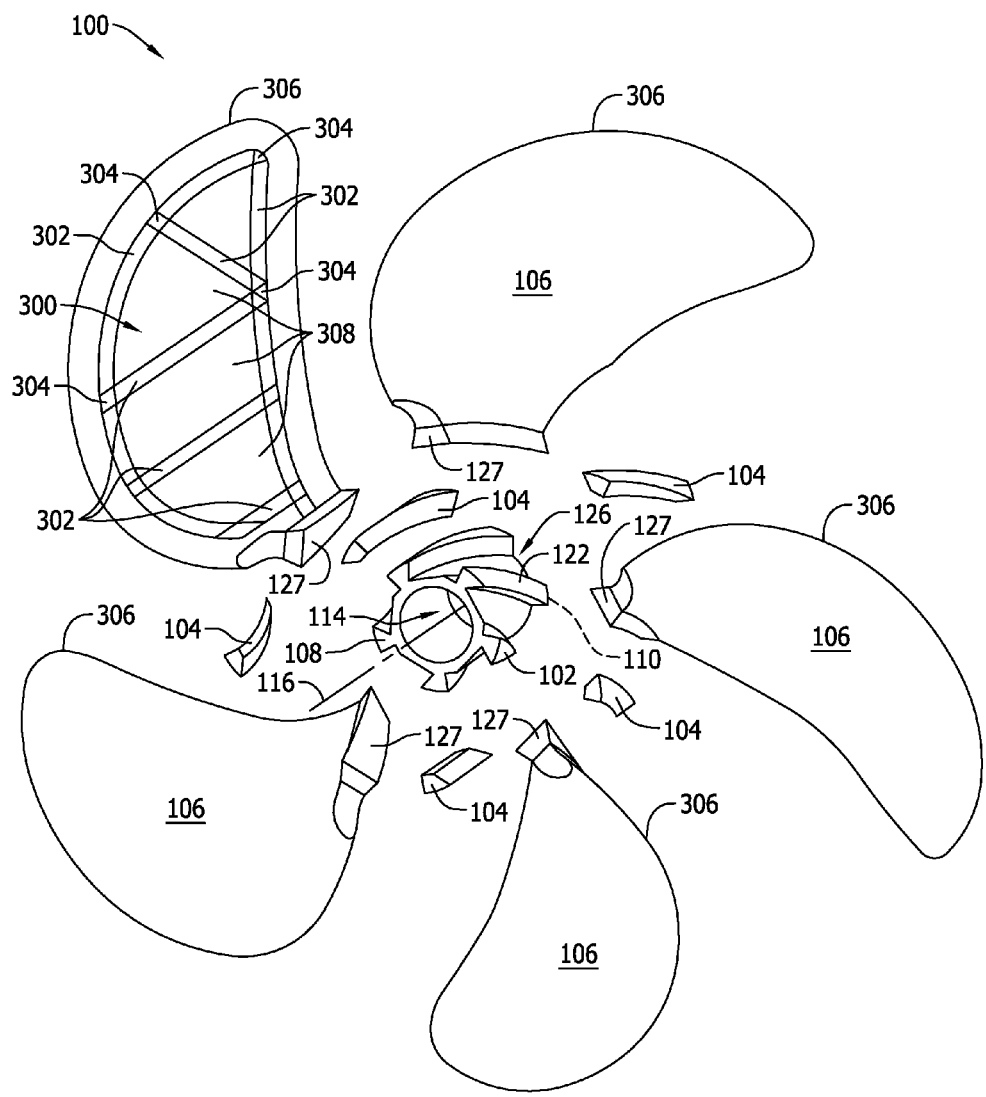
FIG. 3 is an exploded view of the marine propeller assembly of FIG. 1.

FIG. 3 is an exploded view of marine propeller assembly 100 in accordance with an example embodiment of the present disclosure. In the example embodiment, hub 102 is illustrated with plurality of dovetail grooves 126 extending arcuately between first face 108 and second face 110 (not shown in FIG. 3, facing away from the view in FIG. 3). A blade 106 is illustrated cutaway showing an interior structure 300 that may be used in one embodiment. Interior structure 300 includes a plurality of frame members 302 coupled together at respective frame joints 304. In various embodiments, dovetail 127 is formed of a metallic material and coupled to a respective composite blade portion 306 of a respective blade 106 of plurality of blades 106. In various embodiments, each blade 106 may be formed using interior structure 300, which may be at least partially surrounded by a filler material, such as, but not limited to, a foamed material 308.

Figure 4:
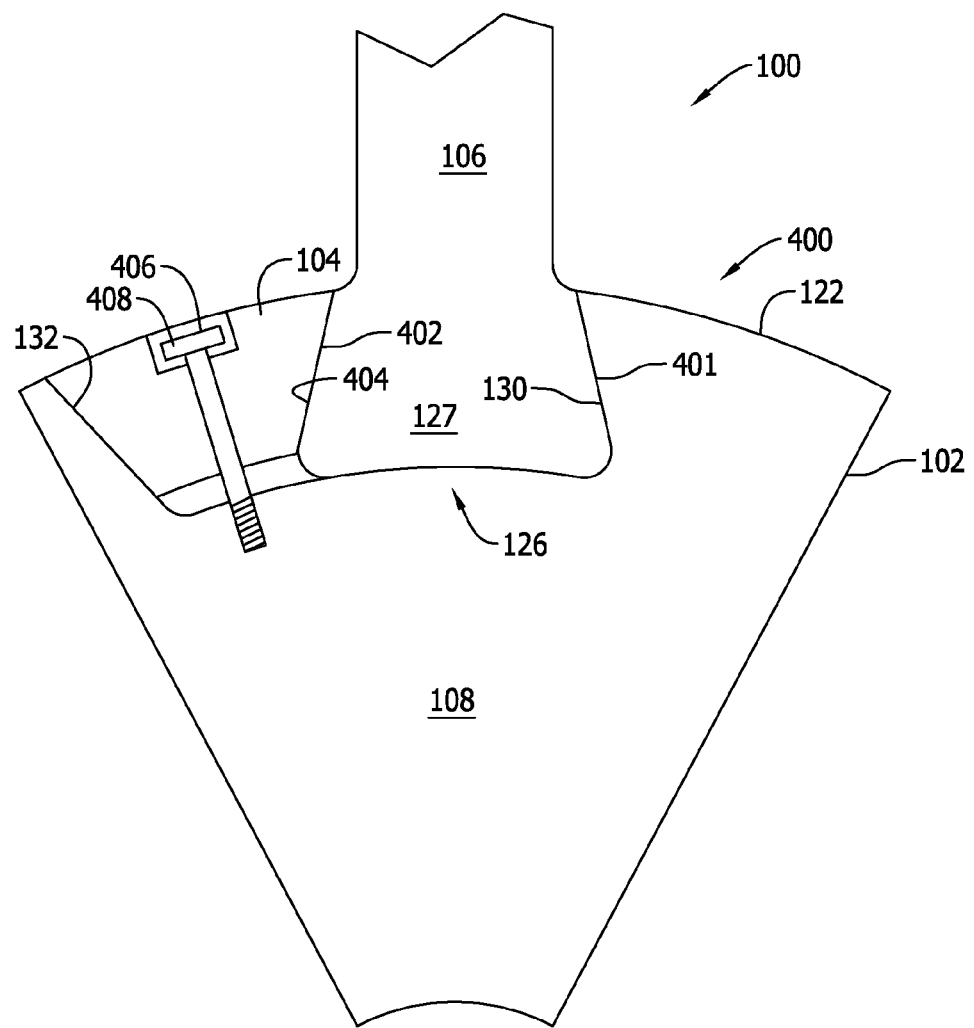
FIG. 4 is an axial view, looking forward of a circumferential segment of the marine propeller assembly 100 (shown in FIG. 1)

FIG. 4 is an axial view, looking forward of a circumferential segment 400 of marine propeller assembly 100 (shown in FIG. 1). In the example embodiment, dovetail 127 is retained in dovetail groove 126 by undercut sidewall 130 engaging a complementary first dovetail sidewall 401 and by a first wedge sidewall 402 engaging a complementary second dovetail sidewall 404. Wedge 104 is retained in dovetail groove 126 by one or more fasteners, such as, but not limited to, one or more threaded fasteners 406, for example, one or more bolts. In the example embodiment, a head 408 of fastener 406 is countersunk into a radially outer surface of wedge 104.

FIGS. 5-16 are detail views of circumferential segment 400. More specifically, FIGS. 5-16 are detail views of the engagement between first dovetail sidewall 401 and undercut sidewall 130 of FIG. 4 according to different embodiments. Generally, dovetail sidewall 401 includes a bearing portion 410 configured to engage undercut sidewall 130 and a clearance portion 412 configured to be spaced from undercut sidewall 130 during relatively light loading of propeller assembly 100 (shown in FIG. 1) and to be engaged with undercut sidewall 130 during relatively heavy loading of propeller assembly 100. In the embodiments of FIGS. 5-16, clearance portion 412 is radially outward relative to bearing portion 410.

FIG. 5 is a first detail 501 depicting a first embodiment of the engagement between first dovetail sidewall 401 and undercut sidewall 130. In first detail 501, first dovetail sidewall 401 includes a first dovetail portion 550A corresponding to bearing portion 410 and a second dovetail portion 552A corresponding to clearance portion 412. Second dovetail portion 552A is linearly divergent from undercut sidewall 130, thereby defining a clearance gap 554A between first dovetail sidewall 401 and undercut sidewall 130.

FIG. 6 is a second detail 502 depicting a second embodiment of the engagement between first dovetail sidewall 401 and undercut sidewall 130. In second detail 502, first dovetail sidewall 401 includes a first dovetail portion 550B corresponding to bearing portion 410 and a second dovetail portion 552B corresponding to clearance portion 412. Second dovetail portion 552B is concavely arcuately divergent from undercut sidewall 130, thereby defining a clearance gap 554B between first dovetail sidewall 401 and undercut sidewall 130.

FIG. 7 is a third detail 503 depicting a third embodiment of the engagement between first dovetail sidewall 401 and undercut sidewall 130. In third detail 503, first dovetail sidewall 401 includes a first dovetail portion 550C corresponding to bearing portion 410 and a second dovetail portion 552C corresponding to clearance portion 412. Second dovetail portion 552C is linearly divergent from undercut sidewall 130 at two distinct angles, thereby defining a clearance gap 554C between first dovetail sidewall 401 and undercut sidewall 130.

FIG. 8 is a fourth detail 504 depicting a fourth embodiment of the engagement between first dovetail sidewall 401 and undercut sidewall 130. In fourth detail 504, first dovetail sidewall 401 includes a first dovetail portion 550D corresponding to bearing portion 410 and a second dovetail portion 552D corresponding to clearance portion 412. Second dovetail portion 552D is convexly arcuately divergent from undercut sidewall 130, thereby defining a clearance gap 554B between first dovetail sidewall 401 and undercut sidewall 130.

FIG. 9 is a fifth detail 505 depicting a fifth embodiment of the engagement between first dovetail sidewall 401 and undercut sidewall 130. In fifth detail 505, first dovetail sidewall 401 includes a first dovetail portion 550E corresponding to bearing portion 410 and a second dovetail portion 552E corresponding to clearance portion 412. Second dovetail portion 552E is both linearly divergent and concavely arcuately divergent from undercut sidewall 130, thereby defining a clearance gap 554D between first dovetail sidewall 401 and undercut sidewall 130.

FIG. 10 is a sixth detail 506 depicting a sixth embodiment of the engagement between first dovetail sidewall 401 and undercut sidewall 130. In sixth detail 506, first dovetail sidewall 401 includes a first dovetail portion 550F corresponding to bearing portion 410 and a second dovetail portion 552F corresponding to clearance portion 412. Second dovetail portion 552F is both concavely and convexly arcuately divergent from undercut sidewall 130, thereby defining a clearance gap 554F between first dovetail sidewall 401 and undercut sidewall 130.

FIG. 11 is a seventh detail 507 depicting a seventh embodiment of the engagement between first dovetail sidewall 401 and undercut sidewall 130. In seventh detail 507, undercut sidewall 130 includes a first undercut sidewall portion 550G corresponding to bearing portion 410 of first dovetail sidewall 401 and a second undercut sidewall portion 552G corresponding to clearance portion 412 of first dovetail sidewall 401. Second sidewall portion 552G is linearly divergent from first dovetail sidewall 401, thereby defining a clearance gap 554G between first dovetail sidewall 401 and undercut sidewall 130.

FIG. 12 is an eighth detail 508 depicting an eighth embodiment of the engagement between first dovetail sidewall 401 and undercut sidewall 130. In eighth detail 508, undercut sidewall 130 includes a first undercut sidewall portion 550H corresponding to bearing portion 410 of first dovetail sidewall 401 and a second undercut sidewall portion 552H corresponding to clearance portion 412 of first dovetail sidewall 401. Second sidewall portion 552H is concavely arcuately divergent from first dovetail sidewall 401, thereby defining a clearance gap 554H between first dovetail sidewall 401 and undercut sidewall 130.

FIG. 13 is a ninth detail 509 depicting a ninth embodiment of the engagement between first dovetail sidewall 401 and undercut sidewall 130. In ninth detail 509, undercut sidewall 130 includes a first undercut sidewall portion 550I corresponding to bearing portion 410 of first dovetail sidewall 401 and a second undercut sidewall portion 552J corresponding to clearance portion 412 of first dovetail sidewall 401. Second sidewall portion 552J is linearly divergent from first dovetail sidewall 401 at two distinct angles, thereby defining a clearance gap 554J between first dovetail sidewall 401 and undercut sidewall 130.

FIG. 14 is a tenth detail 510 depicting a tenth embodiment of the engagement between first dovetail sidewall 401 and undercut sidewall 130. In tenth detail 510, undercut sidewall 130 includes a first undercut sidewall portion 550J corresponding to bearing portion 410 of first dovetail sidewall 401 and a second undercut sidewall portion 552J corresponding to clearance portion 412 of first dovetail sidewall 401. Second sidewall portion 552J is convexly arcuately divergent from first dovetail sidewall 401, thereby defining a clearance gap 554J between first dovetail sidewall 401 and undercut sidewall 130.

FIG. 15 is an eleventh detail 511 depicting an eleventh embodiment of the engagement between first dovetail sidewall 401 and undercut sidewall 130. In eleventh detail 511, undercut sidewall 130 includes a first undercut sidewall portion 550J corresponding to bearing portion 410 of first dovetail sidewall 401 and a second undercut sidewall portion 552K corresponding to clearance portion 412 of first dovetail sidewall 401. Second sidewall portion 552K is both linearly divergent and concavely arcuately divergent from first dovetail sidewall 401, thereby defining a clearance gap 554K between first dovetail sidewall 401 and undercut sidewall 130.

FIG. 16 is a twelfth detail 512 depicting a twelfth embodiment of the engagement between first dovetail sidewall 401 and undercut sidewall 130. In twelfth detail 512, undercut sidewall 130 includes a first undercut sidewall portion 550J corresponding to bearing portion 410 of first dovetail sidewall 401 and a second undercut sidewall portion 552L corresponding to clearance portion 412 of first dovetail sidewall 401. Second sidewall portion 552L is both convexly and concavely arcuately divergent from first dovetail sidewall 401, thereby defining a clearance gap 554L between first dovetail sidewall 401 and undercut sidewall 130.

Figure 17:
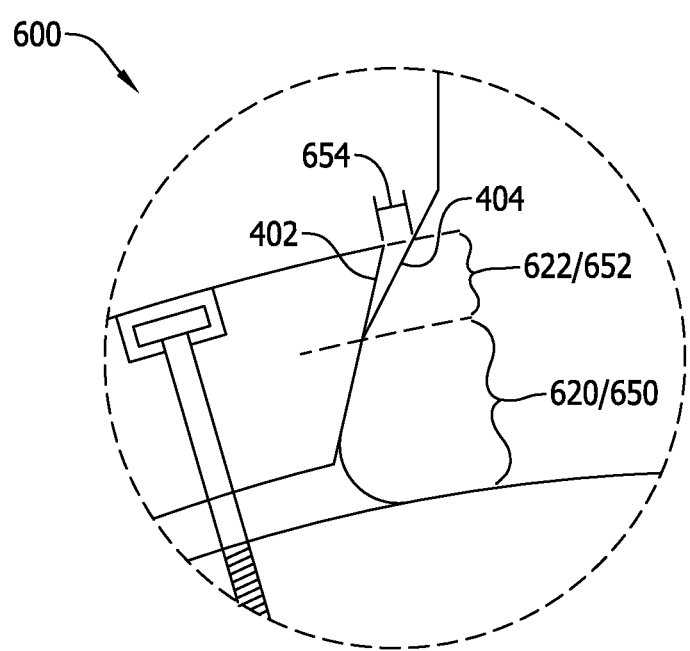
FIG. 17 is a detail view of the circumferential segment of FIG. 4.

FIG. 17 is a detail view of circumferential segment 400. Specifically, FIG. 17 is a detail view 600 of the engagement between second dovetail sidewall 404 and wedge sidewall 402 of FIG. 4 according to an alternative embodiment. In the alternative embodiment, second dovetail sidewall 404 includes a bearing portion 620 configured to engage wedge sidewall 402 and a clearance portion 622 configured to be spaced from wedge sidewall 402 during relatively light loading of propeller assembly 100 (depicted in FIG. 1) and to be engaged with second dovetail sidewall 404 during relatively heavy loading of propeller assembly 100. The engagement between second dovetail sidewall 404 and wedge sidewall 402 may be similar to, but is not limited to, the engagements depicted in FIGS. 5-16. For example, in the embodiment depicted in FIG. 17 (and similar to the embodiment depicted in FIG. 5), second dovetail sidewall 404 includes a first dovetail portion 650 corresponding to bearing portion 620 and a second dovetail portion 652 corresponding to clearance portion 622. Second dovetail portion 652 is linearly divergent from wedge sidewall 402, thereby defining a clearance gap 654 between second dovetail sidewall 404 and wedge sidewall 402. In other embodiments, second dovetail portion 652 may be configured to be any of convexly arcuately divergent from wedge sidewall 402, concavely arcuately divergent from wedge sidewall 402, linearly divergent from wedge sidewall 402, or any combination thereof. In still other embodiments, second dovetail sidewall 404 may be substantially uniform while a portion of wedge sidewall 402 is at least one of linearly divergent and/or arcuately divergent from second dovetail sidewall 404, thereby defining clearance gap 654. In certain embodiments, propeller assembly 100 includes at least one of the engagement between first dovetail sidewall 401 and undercut sidewall 130 described above with reference to FIGS. 5-16 and the engagement between second dovetail sidewall 404 and wedge sidewall 402, as described above with reference to FIG. 17.

Figure 18:
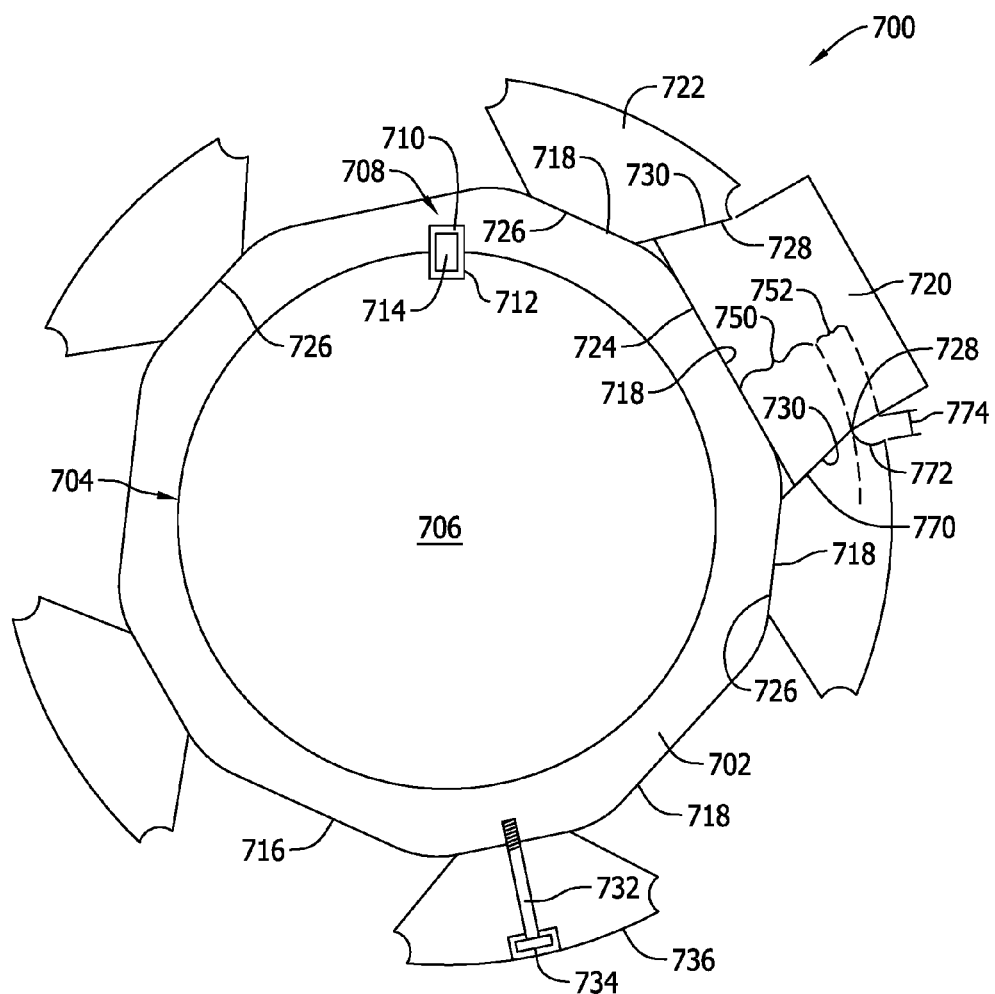
FIG. 18 is an axial view of another embodiment of a marine propeller assembly.

FIG. 18 is an axial view of another embodiment of a marine propeller assembly 700. In the example embodiment, a hub 702 includes a central bore 704 configured to receive a propulsion shaft 706 therethrough. In some embodiments, hub 702 is keyed onto propulsion shaft 706 using, for example, but not limited to, a keyed joint 708 including a keyway 710, a keyseat 712, and a key 714. Keyed joint 708 is used to connect hub 702 to propulsion shaft 706. Keyed joint 708 prevents relative rotation between connect hub 702 to propulsion shaft 706 and facilitates torque transmission between hub 702 and propulsion shaft 706. In one embodiment, an outer radial surface 716 of hub 702 includes a plurality of circumferentially spaced flats 718. Each flat is configured to receive a blade dovetail 720 or a wedge 722. Specifically, flats 718 are generally planar surfaces that are complementary to a planar radially inner surface 724 of dovetail 720 and a radially inner surface 726 of wedge 722. In various embodiments, flats 718 and surfaces 724 and 726 have contoured surfaces that are complementary with respect to each other. For example, flats may include a generally concave contour while surfaces 724 and 726 include a generally convex contour and vice versa. Other contours may be used and each contour may be a simple contour or may be a complex contour. Blade dovetail 720 is retained against hub 702 by wedges 722 positioned on either circumferential side of blade dovetail 720. Wedge sidewalls 728 of wedges 722 are undercut to fit with complementary dovetail sidewalls 730 of blade dovetail 720. Wedges 722 are retained against hub 702 using for example, fasteners 732, such as, but not limited to threaded fasteners, for example, bolts. In one embodiment, a head 734 of fastener 732 is countersunk into a radially outer surface 736 of wedge 722.

In certain embodiments, dovetail sidewalls 730 include a bearing portion 750 configured to engage wedge sidewalls 728 and a clearance portion 752 configured to be spaced from wedge sidewalls 728 during relatively light loading of propeller assembly 700 and to be engaged with at least one of wedge sidewalls 728 during relatively heavy loading of the propeller assembly 700. For example, wedge sidewalls 728 include first wedge sidewall portions 770 corresponding to bearing portions 750 of dovetail sidewalls 730 and second sidewall portions 772 corresponding to clearance portions 752 of dovetail sidewalls 730. Second sidewall portions 772 are concavely arcuately divergent from dovetail sidewalls 730, thereby defining clearance gaps 774 between dovetail sidewalls 730 and wedge sidewalls 728. In other embodiments, second sidewall portions 772 may be convexly arcuately divergent, concavely arcuately divergent, linearly divergent, or any combination thereof. In still other embodiments, wedge sidewalls 728 may be substantially uniform while portions of dovetail sidewalls 730 are at least one of linearly divergent and/or arcuately divergent from wedge sidewalls 728, thereby defining clearance gaps 774. In still other embodiments, propeller assembly 700 may be configured such that only one of the two engagements between blade dovetail 720 and adjacent wedges 722 includes clearance gap 774.

The above-described propeller assembly provides a system for reducing stresses induced in propeller or fan blades, particularly separable composite propeller blades, during operation of the propeller assembly. Specifically, the above-described propeller assembly system includes propeller blades having blade dovetails including a bearing portion configured to engage a channel sidewall (e.g., a sidewall of a channel in a central hub or a sidewall of a blade wedge) and a clearance portion configured to be spaced from the channel sidewall during relatively light loading of the propeller assembly and to be engaged with the channel sidewall during relatively heavy loading of the propeller assembly.

An exemplary technical effect of the methods, systems, and apparatus described herein includes at least one of: (a) reducing induced stress in the propeller blades, enabling use of lighter, less robust propeller blades; (b) enabling the use of separable propeller blades, facilitating the use of alternative blade construction methods and materials; and (c) reducing overall system weight while maintaining or improving engine performance and mitigating stress risks to the propeller blades.

Exemplary embodiments of propeller systems are described above in detail. The propeller systems are not limited to the specific embodiments described herein, but rather, components of the systems may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A propeller assembly, comprising:
    a central hub comprising:
        a first forward-facing end, a second aft-facing end, and a hub body extending therebetween; and
        a plurality of channels spaced circumferentially around said central hub and extending between said first forward-facing end and said second aft-facing end, each channel of said plurality of channels comprising a channel sidewall;
    a plurality of blade wedges configured to be inserted into said plurality of channels, each blade wedge of said plurality of blade wedges comprising a wedge sidewall; and
    a plurality of blades, each blade of said plurality of blades comprising a blade dovetail retained within a respective channel of said plurality of channels by a respective blade wedge of said plurality of blade wedges, each said blade dovetail comprising a dovetail face configured to engage one of a respective channel sidewall of said respective channel of said plurality of channels and a respective wedge sidewall of said respective blade wedge of said plurality of blade wedges, each said dovetail face comprising:
        a bearing portion configured to engage said one of said respective channel sidewall of said respective channel and said respective wedge sidewall of said respective blade wedge; and
        a clearance portion configured to be spaced from said one of said respective channel sidewall and said respective wedge sidewall by a clearance gap during a first loading of the propeller assembly and to be engaged with said one of said respective channel sidewall and said respective wedge sidewall during a second loading of the propeller assembly, the second loading greater than the first loading.

2. The propeller assembly in accordance with claim 1, wherein said each channel extends arcuately between said forward-facing end and said aft-facing end.

3. The propeller assembly in accordance with claim 1, wherein each said dovetail face further comprises:
    a first dovetail face portion substantially parallel to said one of said respective channel sidewall of said respective channel of said plurality of channels and said wedge sidewall of said respective blade wedge of said plurality of blade wedges; and
    a second dovetail face portion divergent from said one of said respective channel sidewall and said respective wedge sidewall.

4. The propeller assembly in accordance with claim 3, wherein each said second dovetail face portion is at least one of (i) linearly divergent at one angle from one of said respective channel sidewall of said respective channel of said plurality of channels and said respective wedge sidewall of said respective blade wedge of said plurality of blade wedges; (ii) linearly divergent at multiple angles from said one of said respective channel sidewall and said respective wedge sidewall; and (iii) arcuately divergent from said one of said respective channel sidewall and said respective wedge sidewall.

5. The propeller assembly in accordance with claim 1, wherein each said one of said respective channel sidewall of said respective channel of said plurality of channels and said respective wedge sidewall of said respective blade wedge of said plurality of blade wedges comprises:
    a first wall portion substantially parallel to said dovetail face; and
    a second wall portion divergent from said dovetail face.

6. The propeller assembly in accordance with claim 5, wherein each said second wall portion is at least one of (i) linearly divergent at one angle from said dovetail face; (ii) linearly divergent at multiple angles from said dovetail face; and (iii) arcuately divergent from said dovetail face.

7. The propeller assembly in accordance with claim 1, wherein said each blade comprises one of a metal material, a composite material, and a combination thereof.

8. The propeller assembly in accordance with claim 1, wherein each said blade dovetail further comprises:
    a second dovetail face configured to engage a second sidewall of said respective channel sidewall of said respective channel of said plurality of channels and said respective wedge sidewall of said respective blade wedge of said plurality of blade wedges, each said second dovetail face comprising:
        a second bearing portion configured to engage said second sidewall of said respective channel sidewall of said respective channel and said respective wedge sidewall of said respective blade wedge; and
        a second clearance portion configured to be spaced from said second sidewall of said respective channel sidewall and said respective wedge sidewall by a second clearance gap during a third loading of the propeller assembly and to be engaged with said second sidewall of said respective channel sidewall and said respective wedge sidewall during a fourth loading of the propeller assembly, the fourth loading greater than the third loading.

9. A separable blade assembly for use in a rotating bladed assembly, the rotating bladed assembly including a central hub including a first forward-facing end, a second aft-facing end, and a hub body extending therebetween, and a plurality of channels spaced circumferentially around the central hub and extending between the first forward-facing end and the second aft-facing end, said blade assembly comprising:
    a blade wedge configured to be inserted into a respective channel of the plurality of channels, said blade wedge comprising a wedge sidewall; and
    a blade comprising a blade dovetail configured to be retained within the respective channel of the plurality of channels by said blade wedge, said blade dovetail comprising a dovetail face configured to engage one of a respective channel sidewall of the respective channel and said wedge sidewall, said dovetail face comprising:
        a bearing portion configured to engage said one of the respective channel sidewall of the respective channel and said wedge sidewall; and a clearance portion configured to be spaced from said one of the respective channel sidewall and said wedge sidewall by a clearance gap during a first loading of the rotating bladed assembly and to be engaged with said one of the respective channel sidewall and the respective wedge sidewall during a second loading of the propeller assembly, the second loading greater than the first loading.

10. The separable blade assembly in accordance with claim 9, wherein said dovetail face comprises:
   a first dovetail face portion substantially parallel to said one of the respective channel sidewall of the respective channel of the plurality of channels and said wedge sidewall; and
   a second dovetail face portion divergent from said one of the respective channel sidewall and said wedge sidewall.

11. The separable blade assembly in accordance with claim 10, wherein said second dovetail face portion is configured to be, when said blade dovetail is retained within the respective channel by said blade wedge, at least one of (i) linearly divergent at one angle from said one of the respective channel sidewall of the respective channel of the plurality of channels and said wedge sidewall; (ii) linearly divergent at multiple angles from said one of the respective channel sidewall and said wedge sidewall; and (iii) arcuately divergent from said one of the respective channel sidewall and said wedge sidewall.

12. The separable blade assembly in accordance with claim 9, wherein said one of the respective channel sidewall of the respective channel of the plurality of channels and said wedge sidewall is said wedge sidewall, said wedge sidewall further comprising:
   a first wall portion substantially parallel to said dovetail face; and
   a second wall portion divergent from said dovetail face.

13. The separable blade assembly in accordance with claim 12, wherein said second wall portion is configured to be, when said blade dovetail is retained within the respective channel by said blade wedge, at least one of: (i) linearly divergent at one angle from said dovetail face; (ii) linearly divergent at multiple angles from said dovetail face; and (iii) arcuately divergent from said dovetail face.

14. The separable blade assembly in accordance with claim 9, wherein said blade comprises one of a metal material, a composite material, and a combination thereof.

15. The separable blade assembly in accordance with claim 9, wherein said blade dovetail further comprises:
   a second dovetail face configured to engage a second sidewall of said one of the respective channel sidewall of the respective channel of the plurality of channels and said wedge sidewall, said second dovetail face comprising:
      a second bearing portion configured to engage said second sidewall of the respective channel sidewall and said wedge sidewall; and
      a second clearance portion spaced from said second sidewall of the respective channel sidewall and said wedge sidewall by a second clearance gap during a third loading of the separable blade assembly and to be loaded during a fourth loading of the separable blade assembly, the fourth loading greater than the third loading.

16. A propeller assembly, comprising
a central hub comprising:
   a first forward-facing end, a second aft-facing end, and a hub body extending therebetween; and
   an outer radial surface, said outer radial surface further comprising a plurality of circumferentially spaced flats;
a plurality of blade wedges coupled to at least a portion of said plurality of circumferentially spaced flats, each blade wedge of said plurality of blade wedges comprising a wedge sidewall, wherein said plurality of blade wedges define a plurality of channels spaced circumferentially around said central hub and extending between said forward end and said aft end; and
a plurality of blades, each blade of said plurality of blades comprising a blade dovetail retained within a respective channel of said plurality of channels by a respective blade wedge of said plurality of blade wedges, said blade dovetail comprising a dovetail face configured to engage a respective wedge sidewall of said respective blade wedge of said plurality of blade wedges, each said dovetail face comprising:
   a bearing portion configured to engage said respective wedge sidewall of said respective blade wedge; and
   a clearance portion configured to be spaced from said respective wedge sidewall by a clearance gap during a first loading of the propeller assembly and to be engaged with said respective wedge sidewall during a second loading of the propeller assembly, the second loading greater than the first loading.

17. The propeller assembly in accordance with claim 16, wherein said each channel extends arcuately between said first forward-facing end and said second aft-facing end.

18. The propeller assembly in accordance with claim 16, wherein each said dovetail face comprises:
   a first dovetail face portion substantially parallel to said wedge sidewall of said respective blade wedge of said plurality of blade wedges; and
   a second dovetail face portion divergent from said respective wedge sidewall, wherein each said second dovetail face portion is at least one of (i) linearly divergent at one angle from said respective wedge sidewall of said respective blade wedge of said plurality of blade wedges; (ii) linearly divergent at multiple angles from said respective wedge sidewall; and (iii) arcuately divergent from said respective wedge sidewall.

19. The propeller assembly in accordance with claim 16, wherein each said respective wedge sidewall of said respective blade wedge of said plurality of blade wedges comprises:
   a first wall portion substantially parallel to said dovetail face; and
   a second wall portion divergent from said dovetail face, wherein said second wall portion is at least one of (i) linearly divergent at one angle from said dovetail face; (ii) linearly divergent at multiple angles from said dovetail face; and (iii) arcuately divergent from said dovetail face.

20. The propeller assembly in accordance with claim 16, wherein each said blade comprises one of a metal material, a composite material, and a combination thereof.

* * * * *